(12) United States Patent
Wondraczek

(10) Patent No.: US 8,143,178 B2
(45) Date of Patent: Mar. 27, 2012

(54) BLUE BETA-QUARTZ GLASS-CERAMIC MATERIALS, ARTICLES MADE THEREOF, AND FABRICATION PROCESS

(75) Inventor: Lothar Wondraczek, Erlangen (DE)

(73) Assignee: EuroKera, Chiemy (FR)

( * ) Notice: Subject to any disclaimer, the term of this patent is extended or adjusted under 35 U.S.C. 154(b) by 70 days.

(21) Appl. No.: 12/447,366

(22) PCT Filed: Oct. 25, 2007

(86) PCT No.: PCT/EP2007/061452
§ 371 (c)(1),
(2), (4) Date: Jan. 25, 2010

(87) PCT Pub. No.: WO2008/049873
PCT Pub. Date: May 2, 2008

(65) Prior Publication Data
US 2010/0130341 A1 May 27, 2010

(30) Foreign Application Priority Data

Oct. 27, 2006 (FR) ..................... 06 54585

(51) Int. Cl.
*C03C 10/14* (2006.01)
*C03B 32/02* (2006.01)

(52) U.S. Cl. .................. 501/4; 501/7; 65/33.1; 65/33.8; 65/33.9; 65/134.3

(58) Field of Classification Search .................. 501/4, 7; 65/33.1, 33.8, 33.9, 134.3
See application file for complete search history.

(56) References Cited

U.S. PATENT DOCUMENTS

| | | | | |
|---|---|---|---|---|
| 3,788,865 A * | 1/1974 | Babcock et al. | .................. | 501/7 |
| 4,084,974 A * | 4/1978 | Beall et al. | ........................ | 501/4 |
| 5,064,460 A * | 11/1991 | Aitken | .......................... | 65/33.3 |
| 5,064,461 A * | 11/1991 | Morena et al. | ................. | 65/33.3 |
| 5,069,826 A * | 12/1991 | Cheng | ............................ | 252/587 |
| 5,173,453 A * | 12/1992 | Beall et al. | ........................ | 501/4 |
| 2008/0269039 A1* | 10/2008 | Joubaud et al. | ................. | 501/66 |

* cited by examiner

*Primary Examiner* — Karl Group
(74) *Attorney, Agent, or Firm* — Michael W. Russell

(57) ABSTRACT

The present invention discloses a blue transparent glass-ceramic material comprising β-quartz solid solution as a predominant crystalline phase and process for making same. The glass-ceramic comprises $TiO_2$ as a nucleating agent, sulphur and at least one metal oxide, advantageously MgO and/or ZnO. The process for making the glass-ceramic material comprises including a metal sulphide, such as ZnS and/or MgS, as a reducing agent in melting the precursor glass of the glass-ceramic material.

7 Claims, 1 Drawing Sheet

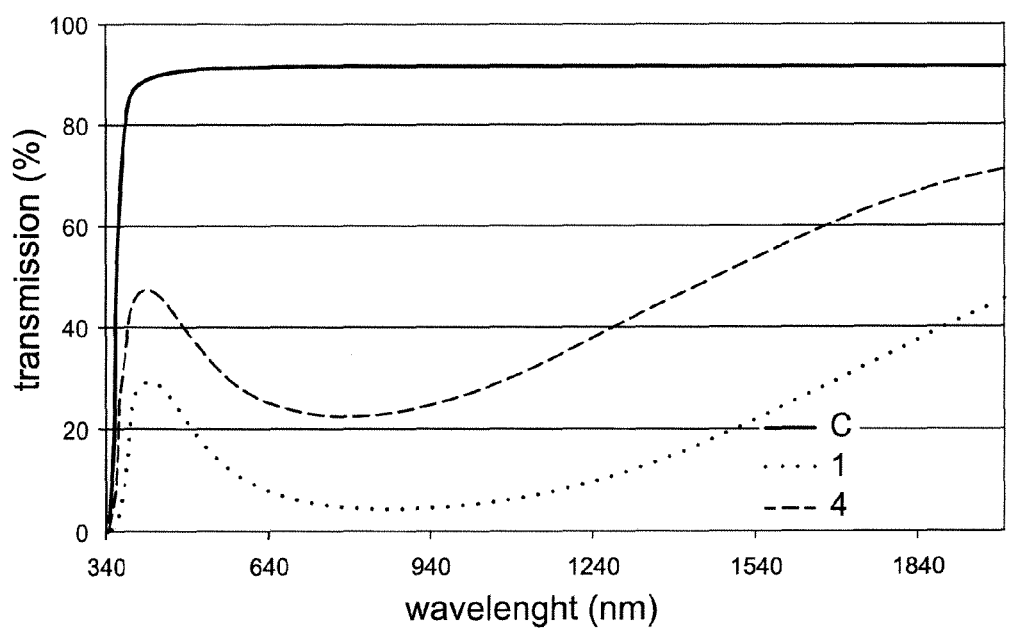

BLUE BETA-QUARTZ GLASS-CERAMIC MATERIALS, ARTICLES MADE THEREOF, AND FABRICATION PROCESS

TECHNICAL FIELD

The present invention relates to β-quartz glass-ceramic materials, articles comprising them and processes for making them. In particular, the present invention relates to β-quartz glass-ceramic materials having a blue color, articles comprising such materials and processes for making them. The present invention is useful, e.g., in making cooktop plates.

BACKGROUND

Transparent glass-ceramics with low thermal expansion coefficient, which contain a solid β-quartz solution as main crystalline phase, have been described in numerous publications, in particular by W. Hoeland and G. Beall in Glass-Ceramic Technology, Am. Ceram. Soc., Westville (2002), pages 88-96. Said glass-ceramics are generally obtained from a precursor glass (more conventionally a mixture of the constituents of said glass) whose composition is of $Li_2O$—$Al_2O_3$—$SiO_2$ type (LAS). Said composition may contain several secondary constituents, such as:

$TiO_2$ and $ZrO_2$, as nucleating agents;
alkaline-earth oxides and phosphates or fluorides to optimise fusion and microstructure in particular;
cocktails of oxides of polyvalent ions responsible for colour such as:
  [$Co_3O_4$—$NiO$—$Fe_2O_3$] (U.S. Pat. No. 5,179,045) for a burgundy colour,
  [$Fe_2O_3$—$CoO$—$Cr_2O_3$—($MnO_2$, $V_2O_5$)] (U.S. Pat. No. 4,526,872) for a light brown colour,
  [$CO_3O_4$—$Fe_2O_3$] (U.S. Pat. No. 5,422,318) for an amber champagne colour,
  [$V_2O_5$—($As_2O_3$, $Sb_2O_3$)] (U.S. Pat. No. 5,070,045) for a black to dark reddish brown colour,
  [$CoO$—$Cr_2O_3$—$MoO_3$—$NiO$)] (U.S. Pat. No. 5,010,041) for a grey to bronze colour; and
  many others for specific colours as desired in given context; and
at least one fining agent, generally $As_2O_3$ and/or $Sb_2O_3$, to eliminate gaseous inclusions from the molten glass mass.

Said glass-ceramics are obtained by heat treating the precursor glass or mixture of constituents of said glass (the term mineral filler can be used, mineral filler itself precursor of said glass). The manufacture of articles in β-quartz glass ceramic conventionally comprises the three main successive steps recalled below:
  a first fusion step to melt a mineral glass or a filler, precursor of such a glass, generally conducted at between 1550 and 1700° C.,
  a second cooling and forming step of the molten glass obtained, and
  a third crystallization or ceramming step of the cooled, formed glass carrying out a suitable heat treatment.

Said glass-ceramics find application in numerous areas and in particular as glass substrate for fireplaces, cook-tops, protective lenses, security glass.

It would be interesting to develop a β-quartz glass-ceramic material exhibiting a blue coloration.

SUMMARY

A first aspect of the present invention relates to a process for producing a transparent blue glass-ceramic material comprising β-quartz solid solution as a main crystalline phase, comprising:

providing a lithium aluminosilicate precursor glass comprising $TiO_2$ as a nucleating agent and at least one glass reducing agent; and
heating the precursor glass under conditions which ensure ceramming;
and characterized in that the precursor glass comprises at least one metal sulphide as glass reducing agent.

In certain embodiments of the process of the present invention, the step of providing a lithium aluminosilicate precursor glass article comprises:
melting a batch mixture of the precursor glass, comprising $TiO_2$ precursor, to form the precursor glass;
shaping the precursor glass into the desired shape, and
the process is characterized in that at least one metal sulphide is included in the batch mixture of the precursor glass.

In certain embodiments of the process of the present invention, said the at least one metal sulphide is selected from among MgS, ZnS and their mixtures.

In certain embodiments of the process of the present invention, the precursor glass comprises at least 0.02 weight % sulphur expressed in terms of ZnS, or in that said batch mixture comprises 0.5 to 3 weight %, advantageously 1 to 2 weight %, ZnS, of the total weight of the batch mixture.

In certain embodiments of the process of the present invention, said glass or said batch mixture comprises at least one oxidant.

In certain embodiments of the process of the present invention, said glass or said batch mixture comprises:
up to 0.6 wt. % $SnO_2$; and/or
up to 1 wt. % $CeO_2$; and/or
up to 1 wt. % $WO_3$.

In certain embodiments of the process of the present invention, said glass or said batch mixture is essentially free of arsenic oxide and antimony oxide.

A second aspect of the present invention relates to a blue, transparent $Li_2O$—$Al_2O_3$—$SiO_2$ type glass-ceramic material comprising β-quartz solid solution as a main crystalline phase, obtainable by a process described summarily above, having a composition:
comprising $TiO_2$, sulphur, at least one metal oxide, advantageously MgO and/or ZnO; and
essentially free of halides and phosphates.

In certain embodiments of the glass-ceramic material of the present invention, the glass-ceramic material has a composition, expressed in terms of weight percentages on the basis of oxides, comprising:

| | |
|---|---|
| $SiO_2$ | 65-72 |
| $Al_2O_3$ | 18-23 |
| $Li_2O$ | 3-5 |
| $K_2O + Na_2O$ | 0-2 |
| MgO | 0-3 |
| SrO | 0-2 |
| BaO | 0-2 |
| ZnO | 0.5-4 |
| $ZrO_2$ | 1-3.3 |
| $TiO_2$ | 0.4-5; and |
| Sulphur (in terms of $SO_3$) | ≧0.01. |

In certain embodiments of the glass-ceramic material of the present invention, the composition of the glass-ceramic material further comprises an oxidant.

In certain embodiments of the glass-ceramic material of the present invention, the composition of the glass-ceramic material comprises:
up to 0.6 wt. % $SnO_2$; and/or
up to 1 wt. % $CeO_2$; and/or
up to 1 wt. % $WO_3$.

One or more embodiments of present invention has one or more of the following advantages: the glass-ceramic can have a low coefficient of thermal expansion; second, the glass-ceramic can have a blue color with various intensity.

BRIEF DESCRIPTION OF THE DRAWING

The accompanying drawing is a diagram showing the transmission curves of a series of glass-ceramic articles according to the present invention and a comparative example.

BEST MODE FOR CARRYING OUT THE INVENTION

The present invention lies in the area of β-quartz glass-ceramics having a blue colour, of greater or lesser darkness. The subject of the invention is more particularly:
- a process for producing transparent blue glass-ceramics containing a solid β-quartz solution as main crystalline phase;
- a process for producing articles in said glass-ceramics;
- novel transparent blue glass-ceramics containing a solid β-quartz solution as main crystalline phase;
- articles in said novel glass-ceramics; and
- precursor glass for said novel glass-ceramics.

The present invention is based on the action of original compounds, within the compositions of said glass-ceramics, to impart the blue colour.

With reference to the blue colour, persons skilled in the art know that while $Ti^{4+}$ ions are essentially colourless, i.e. do not impart colour to the substrate (liquids, glass.) containing the same, $Ti^{3+}$ ions impart a blue colouring to said substrate due to d→d electronic transitions (Phys. Chem. Glass. 42 (2001) 231-239). Therefore one known manner to generate the blue colour within a glass or glass ceramic containing titanium consists of reducing the $Ti^{4+}$ ions.

On the contrary, oxidation removes colour from a substrate which initially contained $Ti^{3+}$ ion.

Obtaining the blue colour for glass-ceramics, with low thermal expansion coefficient, whose composition of $Li_2O$—$Al_2O_3$—$SiO_2$ (LAS) type contains $TiO_2$, by reducing part of the $Ti^{4+}$ ions to $Ti^{3+}$ ions, was therefore described in U.S. Pat. Nos. 4,084,974, 5,064,460 and 5,064,461.

According to the teaching of U.S. Pat. No. 4,084,974, said reducing is performed through the action of a carbonaceous reducing agent chosen from among carbon, sugar and starch. On industrial scale, said action raises problems, in particular with respect to fining and glass homogeneity.

According to the teaching of U.S. Pat. No. 5,064,460, said reducing is conducted through the action of a reducing agent chosen from among a hydrogen-containing phosphate, $Ti_2O_3$ and/or a chloride. Said chloride action raises problems:
- it increases the quantity of residual glass phase after ceramming,
- it leads to the formation of $ZnCl_2$, a volatile chlorinated gas whose release must be controlled and therefore to precursor glasses whose content in ZnO is lowered, leading to an increase in thermal expansion,
- also, to take chloride consumption into account (due to the volatility of $ZnCl_2$), the starting quantity used must be substantial (contents of 6 weight %); which is not without problems related to corrosion, fining.

According to the teaching of U.S. Pat. No. 5,064,461, said reducing is conducted using chlorides under special conditions, intended to minimize the above-mentioned problems. The composition of the initial starting filler is therefore limited with respect to the problem of volatilisation of $ZnCl_2$ in particular. It is therefore zinc free. It is still necessary to use 2 to 6 weight percent of chloride to obtain the desired colour. This raises problems of gas treatment, corrosion, fining and, as indicated above, has an influence on ceramming.

In said context, the inventor can be credited with proposing an original route of particular interest to obtain transparent blue glass ceramics with low thermal expansion coefficient.

Samples 1 mm thick of said glass ceramics generally have the values given below for the parameters L* (lightness), a* and b* (colour coordinates) in the colour space laid down by "CIE 1976 Lab" (International Commission on Illumination):

$10 < L^* < 90$ $-128 < a^* < +60$, and $-128 < b^* < 0$.

The glass-ceramics of the invention also generally have a thermal expansion coefficient (measured at 25-700° C.) of between $-15 \times 10^{-7} K^{-1}$ and $+20 \times 10^{-7} K^{-1}$.

The first subject of the invention relates to an original process for producing a transparent blue glass-ceramic, containing a solid β-quartz solution as main crystalline phase (said solid β-quartz solution representing at least two thirds of the crystalline phase). Said process conventionally comprises heat treatment of a lithium aluminosilicate glass (LAS glass) or of a filler, itself a precursor of such a glass, under conditions which ensure ceramming; said glass or said filler including $TiO_2$, or a source of $TiO_2$, as nucleating agent and at least one glass reducing agent.

Characteristically, for the implementation of said process, at least one metal sulphide is used as glass reducing agent; advantageously a single metal sulphide is used as single glass reducing agent.

The second subject of the present invention concerns a process for producing an article in a transparent blue glass-ceramic containing a solid β-quartz solution as main crystalline phase (said solid β-quartz solution representing at least two thirds of the crystalline phase). Said process, conventionally, comprises:
- melting a lithium aluminosilicate glass (LAS glass) or an inorganic filler, itself a precursor of such a glass,
- cooling the molten glass obtained, and simultaneously forming it into the required shape for the intended end article, and
- ceramming said formed glass;
said glass or said filler including $TiO_2$ or a source of $TiO_2$ as nucleating agent, and at least one glass reducing agent.

Characteristically, for the implementation of said process, at least one metal sulphide is used as glass reducing agent; advantageously a single metal sulphide is used as single glass reducing agent.

For the implementation of the two above processes (processes known per se: ceramming processes conducted on a composition containing $TiO_2$ and a reducing agent a priori able to reduce at least part of the $Ti^{4+}$ ions to $Ti^{3+}$ ions), at least one metal sulphide is used in original, characteristic manner as glass reducing agent.

Said metal sulphide may be used alone or in combination with another metal sulphide and/or with at least one other glass reducing agent of another type (see above).

Advantageously, for the implementation of the processes of the invention, a reducing agent of another type is not used. Most advantageously, a single metal sulphide is used as single glass reducing agent.

For the implementation of the processes of the invention, said at least one metal sulphide is generally chosen from among MgS, ZnS and their mixtures. The use of $Na_2S$ is also possible. ZnS is advantageously used and most advantageously used as single glass reducing agent.

According to the invention, the blue colour is characteristically obtained through the addition of at least one metal sulphide to the composition to be cerammed. As a preferred variant specified above—addition of ZnS—the obtaining of said blue colour is based a priori on the reaction:

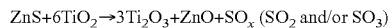
$$ZnS+6TiO_2 \rightarrow 3Ti_2O_3+ZnO+SO_x \ (SO_2 \text{ and/or } SO_3)$$

The quantity used of said at least one metal sulphide is to be adjusted, even optimized, in relation to the context:
said at least one metal sulphide is or is not a single glass reducing agent;
it is added to a filler or is present in a precursor glass, previously formed;
it is desired to obtain a blue of greater or lesser darkness.

The adjustment and optimisation under consideration is within the reach of persons skilled in the art.

If ZnS is used as single glass reducing agent in the meaning of the invention, to implement the process of the invention, use is generally made of:
a glass containing at least 0.02 wt. % sulphur, expressed in ZnS; or
a filler containing 0.5 to 3 wt. %, advantageously 1 to 2 wt. %, of ZnS.

Together with said at least one metal sulphide, the precursor glass or precursor filler may contain at least one oxidant. Said oxidant is suitable for attenuating the reducing action of said at least one metal sulphide, and can thereby enable "controlling" of the final blue colouring of greater or lesser darkness. Said oxidant can be chosen in particular from among $SnO_2$, $CeO_2$, $WO_3$ and their mixtures.

Said glass or said precursor filler may in particular contain:
up to 0.6 wt. % $SnO_2$; and/or
up to 1 wt. % $CeO_2$; and/or
up to 1 wt. % $WO_3$.

By way of illustration, it can be indicated that, in a context of joint use of ZnS and $SnO_2$ in the presence of $TiO_2$, both reactions a priori compete with one another:

$$ZnS+6TiO_2 \rightarrow 3Ti_2O_3+ZnO+SO_x$$

$$ZnS+3SnO_2 \rightarrow 3SnO+ZnO+SO_x.$$

The ceramming processes of the invention—implemented in manner known per se, using an original reducer for the probable reducing of at least part of the $Ti^{4+}$ ions to $Ti^{3+}$ ions—generally include fining the molten glass before the actual ceramming step. The inventor has found that the at least one metal sulphide, used under the invention, optionally in combination with at least one oxidant, acts as a fining agent via the formation of SOx ($SO_2$ and/or $SO_3$). It is therefore possible to minimize, even to cancel out, the presence of conventional fining agents such as $As_2O_3$, $Sb_2O_3$ and halides, when implementing the processes of the invention. This is highly advantageous with respect to the toxicity of the products concerned (As, Sb) and/or facilitates the conducting of the processes (problem of the management of volatile products, corrosion, with halides). Therefore, according to one particularly advantageous variant of the implementation of the ceramming processes of the invention, the glass or precursor filler, precursor of the glass-ceramic or article in glass-ceramic concerned, does not contain any arsenic oxide ($As_2O_3$) or antimony oxide ($Sb_2O_3$), with the exception of unavoidable traces thereof.

Those skilled in the art will already have understood the advantage of the present invention, and of the novel approach proposed (presence of at least one metal sulphide, such as ZnS, MgS, $Na_2S$ with the optional presence of at least one oxidant) to impart a "controlled" blue colour to said glass-ceramic. This novel approach does not require the specific use of a carbon, phosphate or halide. It does not exclude the presence of zinc. It is advantageous with respect to the conducting of fining (see above). It enables a blue colour—of greater or lesser darkness—to be obtained without the use of oxide cocktails which generally contain heavy metals such as Co, Cr, Ni. This novel approach is not detrimental to the transparency and/or thermal expansion properties of the glass-ceramic.

The third subject of the invention concerns transparent blue glass-ceramics which may be obtained using the above-described process (first subject of the said invention).

The fourth subject of the present invention concerns articles in a transparent blue glass-ceramic which may be obtained using the above-described process (second subject of the present invention).

Said glass-ceramics and articles in glass-ceramic carry the signature of the process used to obtain the same:
their composition includes the oxide of the at least one metal used as sulphide i.e. at least one metal oxide; it therefore generally includes the oxide of magnesium and/or zinc, advantageously zinc oxide. The zinc oxide content generally lies between 0.5 and 4 weight percent;
their composition includes sulphur. The sulphur content is not substantial owing to the volatility of $SO_2$ and/or $SO_3$, but it is not a zero content owing to the action of said at least one metal sulphide. It is generally 0.01 weight percent or more, expressed in $SO_3$ (it generally remains at 0.25 weight percent or less expressed in $SO_3$).
their composition is halide and phosphate free, with the exception of unavoidable traces. Therein they distinguish themselves from the compositions of the three US patents mentioned in the introduction hereto. In the light of said introduction, the advantageous absence of halides can be understood. Regarding phosphates, it is known that their presence increases the heterogeneity and opalescence of glass-ceramics.

Advantageously their composition is also free of arsenic oxide and antimony oxide, with the exception of unavoidable traces thereof. Other fining agents are able to be used, and even better the at least one metal sulphide included for the blue colour is itself able to ensure the function of fining agent. At fining level, the joint use is not excluded of said at least one metal sulphide with at least one other fining agent of another type, different from the arsenic oxide or antimony oxide.

The articles in a blue glass-ceramic of the invention may be of different types. They may in particular be cook-tops, cooking utensils, plates of microwave ovens, fireplace windows, fire doors or windows, view windows for pyrolysis or catalysis ovens, lenses or tableware items. This is not an exhaustive list.

Under its third subject, the present invention especially concerns transparent blue glass-ceramics containing a solid β-quartz solution as main crystalline phase whose composition, expressed in weight percentage of oxides, essentially consists of:

| | |
|---|---|
| $SiO_2$ | 65-72 |
| $Al_2O_3$ | 18-23 |

-continued

| | |
|---|---|
| Li$_2$O | 3-5 |
| K$_2$O + Na$_2$O | 0-2 |
| MgO | 0-3 |
| SrO | 0-2 |
| BaO | 0-2 |
| ZnO | 0.5-4 |
| ZrO$_2$ | 1-3.3 |
| TiO$_2$ | 0.4-5; | and whose composition also contains sulphur, expressed in SO$_3$, in a quantity of at least 0.01 weight percent, and is halide- and phosphate-free with the exception of unavoidable traces thereof.

It has been indicated that the composition "essentially consists" of the given percentages of oxides. This means that in the glass-ceramics the sum of the oxides listed represents at least 95 weight %, generally at least 98 weight %. It is actually not excluded that other compounds may be found in small quantities in said glass-ceramics such as La$_2$O$_3$, Gd$_2$O$_3$, Y$_2$O$_3$ and colour agents (such as Nd$_2$O$_3$ and Er$_2$O$_3$ to act on the blue tints).

With reference to the above composition, it can be specified, in non-limiting manner, as follows:

The glass-ceramics under consideration are of LAS type. They contain Li$_2$O, SiO$_2$ and Al$_2$O$_3$ as essential constituents of the solid β-quartz solution, imparting transparency and a low thermal expansion coefficient thereto.

Characteristically they contain zinc oxide. Said zinc oxide is a signature of the action of ZnS in their method of production. It is not excluded either that zinc oxide is used, as raw material, with a particular view to improving fusion and to optimize the thermal expansion coefficient.

TiO$_2$ is used as nucleating agent at a content of between 0.4 and 5 weight %. It is advantageously used at a content of between 2 and 3 weight %, most advantageously at a content of between 2.1 and 2.8 weight %. If the quantity of TiO$_2$ is too low, crystallization will not be homogeneous, crystal size will be increased and opalescence occurs. To obtain the blue colour, generally 0.1 to 10% of titanium is reduced to Ti$^{3+}$.

The glass-ceramics contain ZrO$_2$ as other nucleating agent. The content of ZrO$_2$ is advantageously less than 2 weight %. The dissolution of ZrO$_2$ in the molten glass may give rise to problems.

The alkaline-earth oxides are used to improve fusion properties, to stabilise the glass phase and to act on the microstructure of the glass-ceramic. If they are used in excessive quantity, thermal expansion may reach detrimental values. Small quantities of MgO, preferably less than 1 weight %, even less than 0.7 weight %, and further preferably less than 0.5 weight %, have proved to be capable of reducing dispersion by reducing the size of the crystallites. BaO and SrO may be used to exert an influence on the microstructure, on the refractive index of the residual glass and on the coefficient of thermal expansion.

Alkaline oxides, other than Li$_2$O, i.e. Na$_2$O and K$_2$O are used as flow agents and to increase thermal expansion. The glass-ceramics of the invention advantageously have a K$_2$O and Na$_2$O content of between 0 and 1 weight %. Advantageously, they do not contain Na$_2$O.

The glass-ceramics of the invention contain sulphur (due to the action of ZnS and optionally of at least one other sulphide, whether or not used as reducing agent during the production process). They generally contain little thereof (due to the volatility of SO$_2$ and SO$_3$). The sulphur content, expressed in SO$_3$, is at least 0.01 weight %. It can be indicated, but in no way limited thereto, that said sulphur content generally ranges from 0.01 to 0.25 weight %.

The glass-ceramics of the invention do not contain halides and phosphates, with the exception of unavoidable traces thereof.

Said glass-ceramics may also contain at least one oxidant. It has been seen that in the event that at least one said oxidant is used, the percentages are advantageously:
up to 0.6 wt. % SnO$_2$; and/or
up to 1 wt. % CeO$_2$; and/or
up to 1 wt. % WO$_3$.

Finally, in the light of the above, it will have been understood that the glass-ceramics, whose composition is specified above, also advantageously have a composition that is free of arsenic oxide and antimony oxide with the exception of unavoidable traces thereof.

Under its fourth subject, the present invention particularly concerns articles in a transparent blue glass-ceramic containing a solid β-quartz solution as main crystalline phase, whose composition is as indicated above. Said articles may in particular consist of cook-tops, cooking utensils, plates of microwave ovens, fireplace windows, fire doors or windows, view windows of pyrolysis or catalysis ovens, lenses or tableware items. This list is evidently non-exhaustive.

According to its fifth and final subject-matter, the present invention concerns lithium aluminosilicate glass, precursors of the glass-ceramics whose composition is given above. Said glass has the indicated composition.

The invention is illustrated below in the following examples and appended FIGURE.

More precisely, example C is given as comparative example, and examples 1 to 4 illustrate the said invention.

The appended FIGURE shows transmission (expressed in %) in relation to wavelength (expressed in nanometres) for glass-ceramic samples of examples C, 1 and 4, 1 mm thick (see below). Said samples were prepared by cutting discs 32 mm in diameter of the slabs of glass-ceramics obtained. Said discs (thickness 4 mm: see below) were then polished on both sides down to a thickness of 1 mm.

The curves obtained for the samples in examples 1 and 4 are characteristic of the blue colour of said samples.

EXAMPLES

Batches of 1000 g of raw materials [oxides (example C), oxides+ZnS (examples 1 to 4)], in the quantities given in the first part of Table 1 below, were mixed to prepare homogeneous mixtures.

Said mixtures were placed in platinum crucibles for melting. The filled crucibles were placed in a pre-heated furnace at 1400° C. They underwent the following melt cycle:
temperature rise up to 1630° C. at a heating rate of 2° C./min;
holding this temperature of 1630° C. for 3 hours.

The crucibles were then removed from the furnace and the molten glass was poured onto a pre-heated steel plate. It was rolled to a thickness of 4 mm. Glass slabs approximately 20 cm×30 cm were obtained. They were annealed at 650° C. and then cooled gently.

The colour of the glass slabs obtained varied from light yellow to dark violet.

Said glass slabs were then subjected to ceramming (crystallization) at temperatures ranging from 660 to 900° C., more precisely:

initial heat treatment for 45 min from 660° C. to 820° C.;
  followed by
heat treatment for 15 min at 900° C.

The glass-ceramics obtained had the tints and properties indicated in the second part of Table 1 below.

Five batches were heat treated:
  the batch corresponding to example C (comparative example) does not contain ZnS (no sulphur);
  those corresponding to examples 1, 2 and 4 respectively contain 1.6, 2 and 1.8 weight % ZnS;
  the batch corresponding to example 3 contains 2 weight % ZnS and 0.1 weight % $CeO_2$.

without the use of ZnS in the raw materials. Conventionally, microstructure analyses give crystallite sizes of 25-35 nm for a β-quartz phase of approximately 75 weight %, and a complementary amorphous fraction of 18-22%. Other crystalline phases are also frequently observed in minor quantities, in particular the nucleating phase which, as is known, essentially consists of $TiO_2$ and $ZrO_2$.

The glass-ceramic in example 2 has a different blue to the glass-ceramic in example 1. Said blue is very dark.

The glass-ceramic in example 3 has a lighter blue than the glass-ceramic in example 2, insofar as an oxidant ($CeO_2$) is used.

TABLE 1

|  | Examples | | | | |
| --- | --- | --- | --- | --- | --- |
|  | C | 1 | 2 | 3 | 4 |
| Composition (weight %) | | | | | |
| $SiO_2$ | 67.5 | 67.9 | 67.5 | 67.4 | 67.4 |
| $Al_2O_3$ | 20.3 | 20.4 | 20.3 | 20.3 | 20.3 |
| $Li_2O$ | 3.5 | 3.6 | 3.5 | 3.5 | 3.5 |
| MgO | — | 0.7 | — | — | — |
| ZnO | 2.0 | — | — | — | 0.2 |
| ZnS | — | 1.6 | 2.0 | 2.0 | 1.8 |
| SrO | 1.0 | — | 1.0 | 1.0 | 1.0 |
| $TiO_2$ | 2.6 | 2.6 | 2.6 | 2.6 | 2.6 |
| $ZrO_2$ | 1.7 | 1.7 | 1.7 | 1.7 | 1.7 |
| BaO | 1.4 | 1.5 | 1.4 | 1.4 | 1.4 |
| $CeO_2$ | — | — | — | 0.1 | — |
| Properties after ceramming | | | | | |
| Colour | yellow | dark blue | very dark blue | blue | blue |
| Colour points (1) | | | | | |
| L* | 95.6 | 43.5 |  | 76.2 | 62.9 |
| a* | −0.7 | 0.6 |  | −1.0 | −0.1 |
| b* | 3.0 | −25.2 |  | −12.0 | −15.9 |
| Expansion (25-700° C.) | $-7 \times 10^{-7} K^{-1}$ | $-2.5 \times 10^{-7} K^{-1}$ | $-7 \times 10^{-7} K^{-1}$ | $-6.6 \times 10^{-7} K^{-1}$ | $-7 \times 10^{-7} K^{-1}$ |

(1) The values are given in the "CIE 1976 Lab" colour space, wherein L* represents lightness and a*, b* are the colour coordinates. Said coordinates were obtained using the standard "C" illuminator. The tested samples had a thickness of 1 mm.

The glass-ceramic in example C has the yellow colour usually obtained for this type of glass-ceramic (LAS glass ceramic [$Li_2O$—$Al_2O_3$—$SiO_2$] containing $TiO_2$). Its transmission spectrum (340 to 2000 nm) is shown in appended FIG. 1.

The glass-ceramic of the invention, according to example 1, has a dark blue colour. Its transmission spectrum (340 to 2000 nm) is shown in appended FIG. 1.

The (total) sulphur content (expressed in $SO_3$) was taken to be the content determined by humic method after glass melting (method known per se) and was compared with the content of the glass-ceramic in example C.

For the glass in example 1, a total sulphur content (expressed in terms of $SO_3$) of 0.06 weight % was determined, with a $S^{2-}/S_{total}$ ratio of 0.88.

For the glass and hence glass-ceramic in example C, no sulphur was detected using the same method.

Evidently, it is understood that the use of ZnS in the meaning of the invention leaves traces of S in the material.

Using the coefficient of thermal expansion and X-ray diffraction analysis performed after crystallization, the rate of crystallization of the glass-ceramic in example 1 has been estimated at approximately 80%. This value is not significantly different from those which would be obtained with glass-ceramics of the same type prepared in the same manner The glass-ceramic in example 4 has a lighter blue than the one in example 2, insofar as less ZnS is used. Its transmission spectrum (340 to 2000 nm) is shown in appended FIG. 1.

The invention claimed is:

1. A process for producing a transparent blue glass-ceramic article comprising β-quartz solid solution as a main crystalline phase, comprising:
  providing a lithium aluminosilicate precursor glass article comprising $TiO_2$ as a nucleating agent and at least one glass reducing agent; and
  heating the precursor glass under conditions which ensure ceramming;
  wherein the precursor glass comprises at least one metal sulphide as the glass reducing agent.

2. A process according to claim 1, wherein providing a lithium aluminosilicate precursor glass article comprises:
  melting a batch mixture of the precursor glass, comprising $TiO_2$, to form the precursor glass; and
  shaping the precursor glass into the article,
  wherein at least one metal sulphide is included in the batch mixture of the precursor glass.

3. The process according to claim 1, wherein the at least one metal sulphide is selected from the group consisting of MgS, ZnS and mixtures thereof.

4. The process according to claim 2, wherein the precursor glass comprises at least 0.02 weight % sulphur expressed in terms of ZnS, or said batch mixture comprises 0.5 to 3 weight % ZnS, of the total weight of the batch mixture.

5. The process according to claim 2, wherein said precursor glass or said batch mixture comprises at least one oxidant.

6. The process according to claim 5, wherein said precursor glass or said batch mixture also comprises:

up to 0.6 wt. % $SnO_2$; and/or
up to 1 wt. % $CeO_2$; and/or
up to 1 wt. % $WO_3$.

7. The process according to claim 2, wherein said precursor glass or said batch mixture is essentially free of arsenic oxide and antimony oxide.

* * * * *